(12) United States Patent
Kwon et al.

(10) Patent No.: US 9,966,627 B2
(45) Date of Patent: May 8, 2018

(54) ELECTRODE ASSEMBLY OF INCLINE STRUCTURE AND BATTERY CELL EMPLOYED WITH THE SAME

(71) Applicant: LG CHEM, LTD., Seoul (KR)

(72) Inventors: Sungjin Kwon, Daejeon (KR); Dong-Myung Kim, Daejeon (KR); Kiwoong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 77 days.

(21) Appl. No.: 14/440,740

(22) PCT Filed: Feb. 7, 2014

(86) PCT No.: PCT/KR2014/001048
§ 371 (c)(1),
(2) Date: May 5, 2015

(87) PCT Pub. No.: WO2014/126359
PCT Pub. Date: Aug. 21, 2014

(65) Prior Publication Data
US 2015/0340728 A1 Nov. 26, 2015

(30) Foreign Application Priority Data
Feb. 13, 2013 (KR) ........................ 10-2013-0015272

(51) Int. Cl.
*H01M 10/04* (2006.01)
*H01M 2/02* (2006.01)
(Continued)

(52) U.S. Cl.
CPC ....... *H01M 10/0463* (2013.01); *H01M 2/021* (2013.01); *H01M 2/0212* (2013.01);
(Continued)

(58) Field of Classification Search
CPC .................. H01M 2002/0205; H01M 10/0463
See application file for complete search history.

(56) References Cited

U.S. PATENT DOCUMENTS

| 6,132,477 A | 10/2000 | Warren |
| 6,207,889 B1 * | 3/2001 | Toyomura ....... H01L 31/035272 |
| | | 136/244 |

(Continued)

FOREIGN PATENT DOCUMENTS

| CN | 201038228 Y | 3/2008 |
| CN | 101847755 A | 9/2010 |

(Continued)

OTHER PUBLICATIONS

Chinese Office Action and Search Report dated Jul. 22, 2016, for Chinese Application No. 201480003135.1 with the English translation.

(Continued)

*Primary Examiner* — Imran Akram
(74) *Attorney, Agent, or Firm* — Birch, Stewart, Kolasch & Birch, LLP (57) ABSTRACT

Disclosed herein is a battery cell configured to have a structure in which an electrode assembly, including positive electrodes, negative electrodes, and separators disposed respectively between the positive electrodes and the negative electrodes, is mounted in a battery case, wherein the electrode assembly includes two or more electrodes or unit cells stacked in a height direction when viewed in a plan view, the battery case is provided with a receiving unit, in which electrode assembly is mounted, the electrode assembly is configured to have a quadrangular shape having side (a), side (b), side (c), and side (d) when viewed in a plan view, and inclined such that an interior angle between side (a) of each of the electrode plates or the unit cells, at which an electrode terminal is located, and side (b) adjacent to side (Continued)

(a) is less than 90 degrees, and the receiving unit of the battery case has an internal shape corresponding to a planer shape of the electrode assembly.

19 Claims, 5 Drawing Sheets

(51) Int. Cl.
    *H01M 10/0525*      (2010.01)
    *H01M 10/0585*      (2010.01)

(52) U.S. Cl.
    CPC .... *H01M 10/0525* (2013.01); *H01M 10/0585* (2013.01); *H01M 2220/20* (2013.01); *H01M 2220/30* (2013.01); *Y02E 60/122* (2013.01)

(56) References Cited

U.S. PATENT DOCUMENTS

| | | | |
|---|---|---|---|
| 2001/0005561 A1 | 6/2001 | Yamada et al. | |
| 2004/0121236 A1 | 6/2004 | Shen et al. | |
| 2006/0115721 A1* | 6/2006 | Lee | H01M 10/4207 429/156 |
| 2007/0037048 A1* | 2/2007 | Takeshita | H01M 2/0404 429/99 |
| 2008/0274397 A1* | 11/2008 | Watanabe | B60K 1/04 429/99 |
| 2009/0029242 A1* | 1/2009 | Hirakawa | H01M 2/105 429/129 |
| 2010/0190081 A1 | 7/2010 | Park et al. | |
| 2011/0183183 A1 | 7/2011 | Grady et al. | |
| 2011/0293996 A1* | 12/2011 | Daidoji | H01M 2/22 429/158 |
| 2011/0308831 A1* | 12/2011 | Martinsson | B25F 5/02 173/217 |
| 2012/0015236 A1 | 1/2012 | Spare | |
| 2012/0321921 A1* | 12/2012 | Ronning | H01M 10/6563 429/72 |
| 2014/0050959 A1* | 2/2014 | Ryu | H01M 10/0431 429/94 |
| 2014/0120397 A1 | 5/2014 | Kim et al. | |
| 2014/0308555 A1* | 10/2014 | Hattori | H01M 10/0431 429/94 |

FOREIGN PATENT DOCUMENTS

| | | |
|---|---|---|
| CN | 201956431 U | 8/2011 |
| EP | 1 309 018 A2 | 5/2003 |
| JP | 2001-167743 A | 6/2001 |
| JP | 2006-127882 A | 5/2006 |
| JP | 2009-81066 A | 4/2009 |
| JP | 2012-124182 A | 6/2012 |
| JP | 2012-134165 A | 7/2012 |
| JP | 2014-523102 A | 9/2014 |
| KR | 2002-0030741 A | 4/2002 |
| KR | 2003-0066960 A | 8/2003 |
| KR | 10-2006-0060715 A | 6/2006 |
| KR | WO 2013180378 A1 * | 12/2013 ........ H01M 10/0431 |

OTHER PUBLICATIONS

International Search Report, issued in PCT/KR2014/001048, dated May 8, 2014.

* cited by examiner

ELECTRODE ASSEMBLY OF INCLINE STRUCTURE AND BATTERY CELL EMPLOYED WITH THE SAME

TECHNICAL FIELD

The present invention relates to a battery cell of an incline structure, and more particularly to a battery cell configured to have a structure in which an electrode assembly, including positive electrodes, negative electrodes, and separators disposed respectively between the positive electrodes and the negative electrodes, is mounted in a battery case, wherein the electrode assembly includes two or more electrodes or unit cells stacked in a height direction when viewed in a plan view, the battery case is provided with a receiving unit, in which electrode assembly is mounted, the electrode assembly is configured to have a quadrangular shape having side (a), side (b), side (c), and side (d) when viewed in a plan view, and inclined such that an interior angle between side (a) of each of the electrode plates or the unit cells, at which an electrode terminal is located, and side (b) adjacent to side (a) is less than 90 degrees, and the receiving unit of the battery case has an internal shape corresponding to a planer shape of the electrode assembly.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be generally classified as a cylindrical battery, a prismatic battery, or a pouch-shaped battery. Based on the type of an electrolyte, a lithium secondary battery may be also classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte in a pouch-shaped battery case, made of a laminate sheet including a resin layer and a metal layer, in a sealed state. The electrode assembly mounted in the battery case may be configured to have a jelly-roll (wound) type structure, a stacked type structure, or a combination (stacked/folded) type structure.

Figure 1:
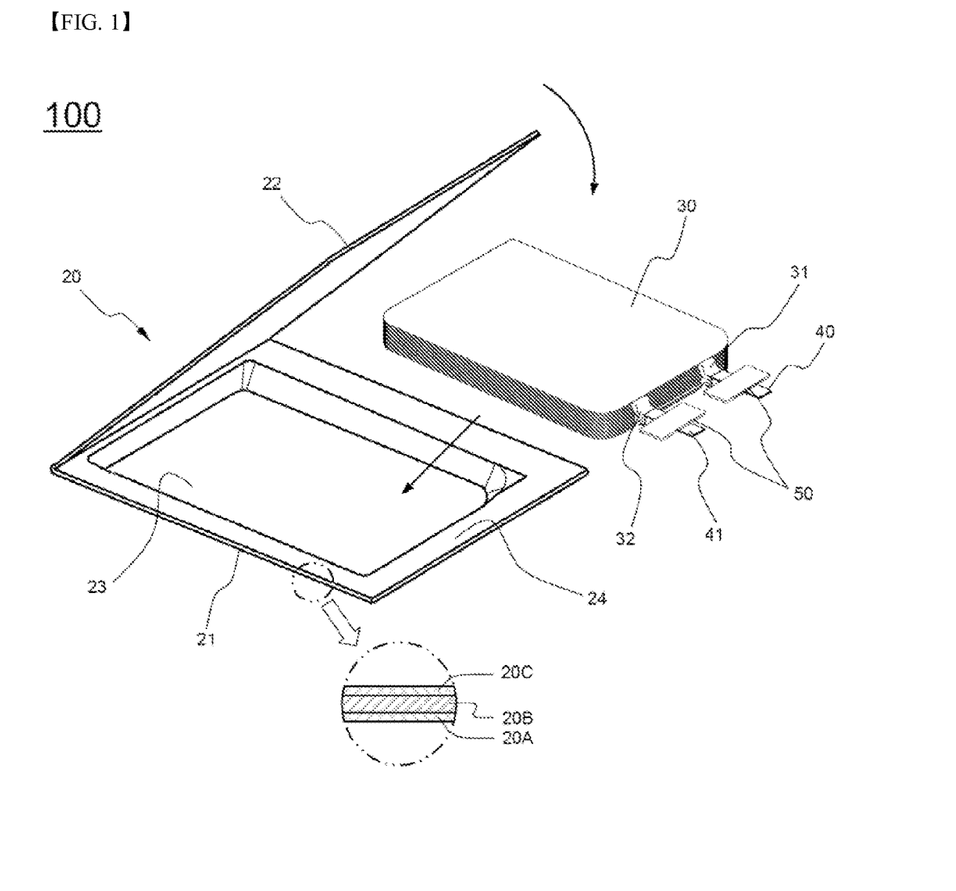
FIG. 1 is a perspective view showing a conventional battery cell.

FIG. 1 is a view typically showing the structure of a pouch-shaped secondary battery including a stacked type electrode assembly.

Referring to FIG. 1, a pouch-shaped secondary battery 10 is configured to have a structure in which an electrode assembly 30, including positive electrodes, negative electrodes, and separators disposed respectively between the positive electrodes and the negative electrodes, each separator being coated with a solid electrolyte, is mounted in a pouch-shaped battery case 20 in a sealed state such that two electrode leads 40 and 41 electrically connected to positive electrode and negative electrode tabs 31 and 32 of the electrode assembly 30 are exposed outward.

The battery case 20 includes a case body 21 having a depressed receiving part 23, in which the electrode assembly 30 is located, and a cover 22 integrally connected to the case body 21.

The battery case 20 is made of a laminate sheet including an outer resin layer 20A constituting the outermost layer of the laminate sheet, an isolation metal layer 20B for preventing penetration of materials, and an inner resin layer 20C for sealing.

The positive electrode tabs 31 and the negative electrode tabs 32 of the stacked type electrode assembly 30 are respectively coupled to the electrode leads 40 and 41 by welding. In addition, insulative films 50 are attached to the top and bottom of each of the electrode leads 40 and 41 to prevent the occurrence of a short circuit between a thermal welding device (not shown) and the electrode leads 40 and 41 and to secure sealing between the electrode leads 40 and 41 and the battery case 20 when the upper end 24 of the case body 21 and the upper end of the cover 22 are thermally welded to each other using the thermal welding device.

In recent years, however, a new type of battery cell has been required in accordance with a trend change for a slim type design or various other designs.

In addition, the above-mentioned battery cells may be configured to include electrode assemblies having the same size or the same capacity. For this reason, in order to manufacture a battery cell having a new structure in consideration of the design of a device, to which the battery cell is applied, it may be necessary to reduce the capacity of the battery cell or modify the design of the device such that the size of the device is increased.

Furthermore, electrical connection may be complicated during modification of the design of the device with the result that it may be difficult to manufacture a battery cell satisfying desired conditions.

Besides, it is necessary to manufacture the battery case based on the shape of the electrode assembly.

Therefore, there is a high necessity for an electrode assembly and a battery case applicable depending upon the shape of a device, to which a battery cell is applied, and a battery cell including the same.

DISCLOSURE

Technical Problem

The present invention has been made to solve the above problems and other technical problems that have yet to be resolved.

Specifically, it is an object of the present invention to provide a battery cell configured to have a structure in which the battery cell can be mounted in various spaces of a device, whereby it is possible to maximally utilize an internal space of the device, and the battery cell can be efficiently mounted in various external structures of the device in addition to a rectangular external structure of the device.

Technical Solution

In accordance with one aspect of the present invention, the above and other objects can be accomplished by the provision of a battery cell configured to have a structure in which an electrode assembly, including positive electrodes, negative electrodes, and separators disposed respectively between the positive electrodes and the negative electrodes, is mounted in a battery case, wherein the electrode assembly includes two or more electrodes or unit cells stacked in a height direction when viewed in a plan view, the battery case is provided with a receiving unit, in which electrode assembly is mounted, the electrode assembly is configured to have a quadrangular shape having side (a), side (b), side (c), and side (d) when viewed in a plan view, and inclined such that an interior angle between side (a) of each of the electrode plates or the unit cells, at which an electrode terminal is located, and side (b) adjacent to side (a) is less than 90 degrees, and the receiving unit of the battery case has an internal shape corresponding to a planer shape of the electrode assembly.

Consequently, it is possible to manufacture battery cells having various capacities and sizes based on the above-described specific structure. In a case in which a device, in which the battery cell is mounted, is manufactured, the battery cell can be effectively mounted in various spaces of the device, whereby it is possible to maximally utilize an internal space of the device.

In a concrete example, each of the unit cells may be a bi-cell in which electrodes located at opposite ends of a structure in which one or more positive electrodes and one or more negative electrodes are stacked in a state in which one or more separators are disposed respectively between the positive electrodes and the negative electrodes have the same polarity or a full cell in which the electrodes located at the opposite ends of the stacked structure have different polarities.

The electrode plates or the unit cells may be stacked such that the electrode terminals are arranged together at upper sides or lower sides of the electrode plates or the unit cells. Alternatively, the electrode plates or the unit cells may be stacked such that first electrode terminals are arranged at upper sides of the electrode plates or the unit cells and second electrode terminals are arranged at lower sides of the electrode plates or the unit cells opposite to the upper sides of the electrode plates or the unit cells.

Arrangement of the electrode terminals of the unit cells is not particularly restricted. For example, the first electrode terminals may be positive electrode terminals, and the second electrode terminals may be negative electrode terminals.

As described above, the electrode assembly of the battery cell according to the present invention is configured to have a quadrangular shape having side (a), side (b), side (c), and side (d) when viewed in a plan view, and inclined such that an interior angle between side (a) of each of the electrode plates or the unit cells, at which an electrode terminal is located, and side (b) adjacent to side (a) is less than 90 degrees. For example, the interior angle between side (a) and side (b) may be 20 to 89 degrees, specifically 30 to 85 degrees, more specifically 40 to 80 degrees.

In a concrete example, side (a) and side (c) may be parallel to each other, and/or side (b) and side (d) may be parallel to each other. For example, the electrode plates or the unit cells may each have a parallelogram shape or a diamond shape when viewed in a plan view.

However, the shape of the electrode plates or the unit cells is not limited to the above examples.

The battery cell may be, for example, a pouch-shaped battery cell having an electrode assembly mounted in a pouch-shaped battery case. However, the present invention is not limited thereto.

Specifically, the pouch-shaped battery cell may be configured to have a structure in which an electrode assembly is mounted in a pouch-shaped battery case made of a laminate sheet, such as an aluminum laminate sheet, including a resin layer and a metal layer in a state in which the electrode assembly is connected to electrode terminals protruding outward from the battery case.

The battery case is manufactured to have a sufficient thickness for the battery case to exhibit predetermined flexibility required to form a receiving unit. If the thickness of the battery case is too large, the battery case may be damaged due to lack of flexibility when the receiving unit is formed. In addition, the volume and weight of the battery cell are increased. On the other hand, if the thickness of the battery case is too small, the battery case may be easily damaged due to external impact. Preferably, therefore, the battery case has a thickness of 50 to 200 μm, at which the battery case exhibits appropriate flexibility and durability.

The battery case may include an upper case and a lower case, which may be separated from each other or connected to each other at one ends thereof.

The external shape of the battery case may be formed using various methods.

In a concrete example, the battery case may be drawn into the same shape as an electrode assembly having an interior angle between side (a) and side (b) of less than 90 degrees to form a receiving unit.

In another concrete example, the battery case may be drawn into the same shape as an electrode assembly having an interior angle between side (a) and side (b) of 90 degrees to form a receiving unit.

In the latter case, for example, the electrode assembly having the stacked electrodes or unit cells according to the present invention may be mounted in the receiving unit of the battery case, and then vacuum may be applied into the receiving unit such that the receiving unit shrinks and thus the battery case is deformed so as to correspond to the external shape of the electrode assembly. The electrode assembly is configured to have a structure in which, for example, parallelogram-shaped or diamond-shaped electrodes or unit cells are stacked. Consequently, when the electrode assembly is mounted in the receiving unit of the battery case having an interior angle between side (a) and side (b) of 90 degrees, and vacuum is applied into the receiving unit, the battery case shrinks and is deformed so as to correspond to the external shape of the electrode assembly.

The above-described vacuum application method may solve a problem that it is necessary to manufacture a new battery case whenever the design of the electrode assembly is changed and, in addition, restrain a phenomenon in which stress concentrates locally on the battery case.

Specifically, the receiving unit of the battery case may have a rectangular parallelepiped shape including a planar region corresponding to the size of the upper end of the electrode assembly before vacuum is applied into the battery case. In this case, a region of the receiving unit having a rectangular parallelepiped shape is deformed into an internal shape corresponding to the planar shape of the electrode assembly.

The battery cell may be a lithium ion battery cell or a lithium ion polymer battery cell. However, the present invention is not limited thereto.

In general, a lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the applied mixture. A filler may be further added to the mixture as needed.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in the battery to which it is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in the battery to which it is applied and is made of a fibrous material. As examples of the filler, there may be used olefin polymers, such as polyethylene and polypropylene; and fibrous materials, such as glass fiber and carbon fiber.

On the other hand, the negative electrode is prepared by applying and drying a negative electrode active material to a negative electrode current collector. The above-described components may be selectively added to the negative electrode active material as needed.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; conductive polymer, such as polyacetylene; or a Li—Co—Ni based material.

The separator is disposed between the positive electrode and the negative electrode. As the separator, for example, an insulative thin film exhibiting high ion permeability and high mechanical strength may be used. The separator generally has a pore diameter of 0.01 to 10 µm and a thickness of 5 to 300 µm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may function as the separator.

The non-aqueous electrolytic solution containing lithium salt is composed of a polar organic electrolytic solution and lithium salt. As the electrolytic solution, a non-aqueous liquid electrolytic solution, organic solid electrolyte, or inorganic solid electrolyte may be used.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas.

In accordance with another aspect of the present invention, there is provided a device including the battery cell with the above-stated construction as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

In accordance with a further aspect of the present invention, there is provided a battery pack including two or more battery cells with the above-stated construction as unit cells. That is, there is provided a battery pack configured to have a structure in which two or more battery cells as unit cells are connected in series and/or parallel to each other. The battery pack may be used in a device, such as a mobile phone, a portable computer, a smart phone, a tablet PC, a smart pad, a netbook computer, a light electronic vehicle (LEV), an electric vehicle, a hybrid electric vehicle, a plug-in hybrid electric vehicle, or a power storage device.

The structure of the device and a method of manufacturing the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
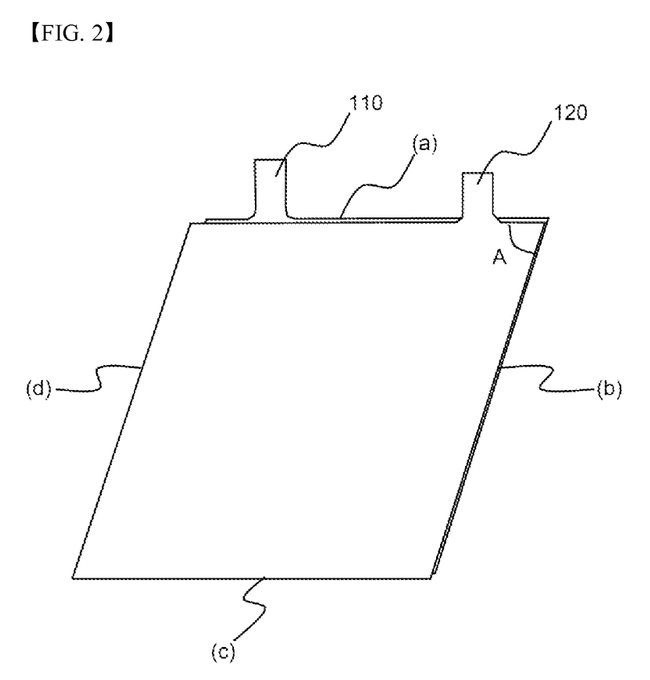
FIG. 2 is a plan view showing electrodes according to an embodiment of the present invention.
Figure 3:
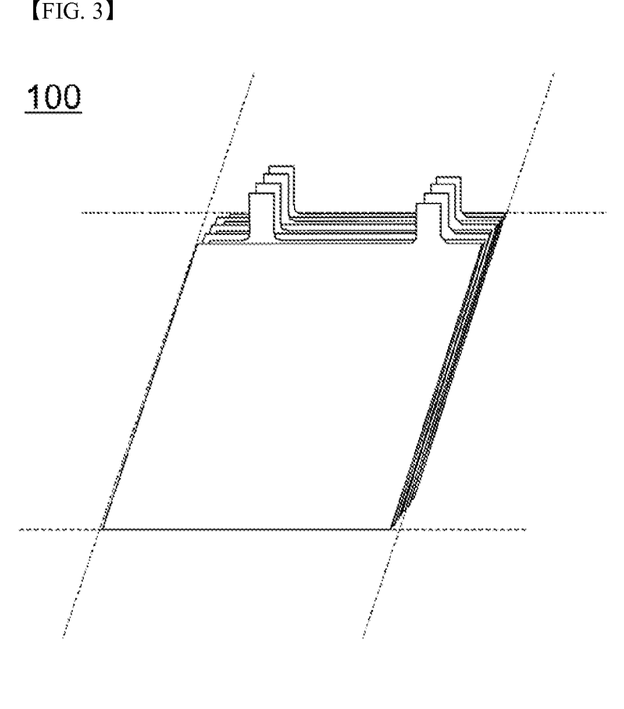
FIG. 3 is a perspective view showing an electrode assembly according to an embodiment of the present invention.

FIG. 2 is a plan view showing electrodes according to an embodiment of the present invention, and FIG. 3 is a perspective view showing an electrode assembly according to an embodiment of the present invention.

Referring to these figures, an electrode assembly 100 according to an embodiment of the present invention includes two or more electrodes stacked in a height direction when viewed in a plan view. Each of the electrodes is configured to have a quadrangular shape having side (a), side (b), side (c), and side (d) when viewed in a plan view. Each of the electrodes is formed such that an interior angle between side (a), at which an electrode terminal 110 or 120 is located, and side (b) adjacent to side (a) is about 70 degrees.

Positive electrode plates and negative electrode plates are stacked in a state in which separators are disposed respectively between the positive electrode plates and the negative electrode plates to constitute a full cell in which the electrodes located at opposite ends of the stacked structure have different polarities. The electrode plates are stacked such that the electrode terminals 110 and 120 are located at the upper sides, i.e. sides (a), of the respective electrode plates.

Consequently, the electrodes are stacked in a height direction to constitute the electrode assembly 100 according to the present invention, and the electrode assembly 100 is mounted in a pouch-shaped battery case in a sealed state to constitute a battery cell.

Figure 4:
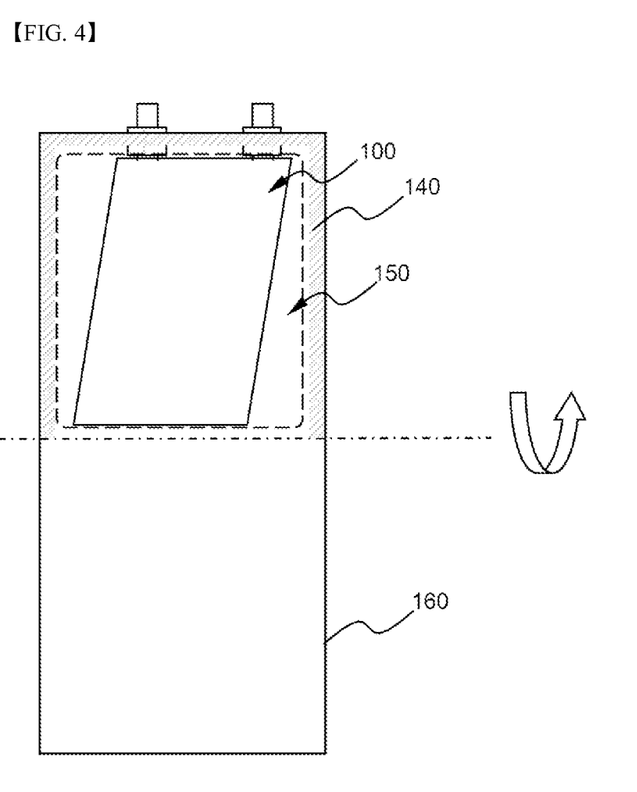
FIG. 4 is a typical view showing a process of receiving the electrode assembly according to the present invention in a battery case having a receiving unit.
Figure 5:
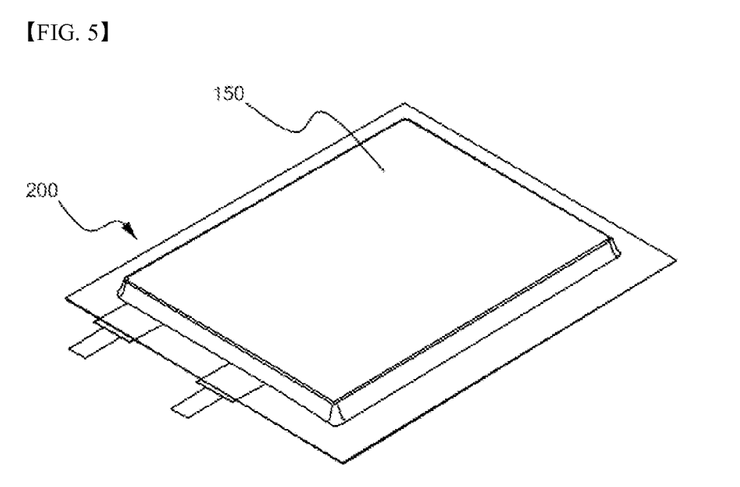
FIGS. 5 and 6 are typical views showing a process in which the receiving unit of the battery case is deformed.
Figure 6:
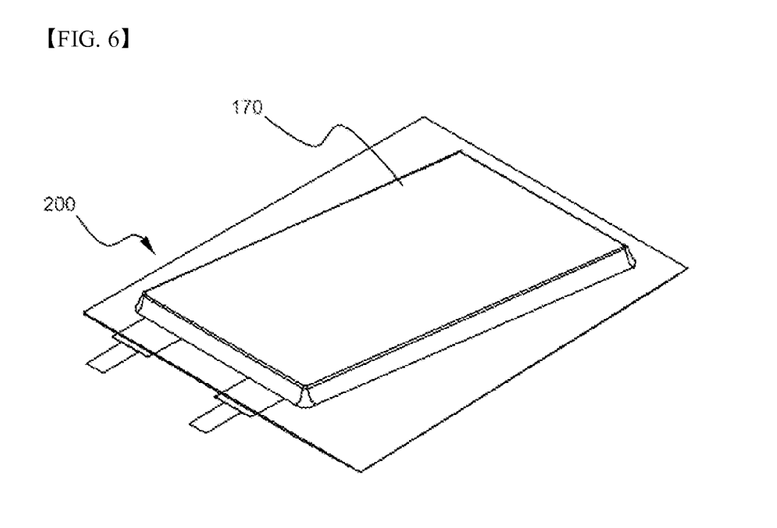

FIG. 4 is a typical view showing a process of receiving the electrode assembly according to the present invention in a battery case having a receiving unit, and FIGS. 5 and 6 are typical views showing a process in which the receiving unit of the battery case is deformed.

Referring first to FIG. 4, the electrode assembly 100 according to the present invention is mounted in a receiving unit 150 of a battery case 160, and then the battery case 160 is folded in two. In a state in which the electrode assembly 100 is mounted in the receiving unit 150 of the battery case 160, an outer edge of the battery case 160 are sealed by thermal welding.

Referring now to FIGS. 5 and 6, a receiving unit 150 of a battery case 200 is configured to have a rectangular parallelepiped shape including a planar region corresponding to the size of the upper end of the electrode assembly. Vacuum is applied into the battery case 200 through one unsealed side of the battery case 200 to remove a surplus space defined between the receiving unit 150 of the battery case 200 and the electrode assembly 100.

During application of vacuum, the receiving unit 150 comes into tight contact with the outer surface of the electrode assembly 100, which is formed to have a parallelogram shape, with the result that the receiving unit 150 is changed into a receiving unit 170 having a shape corresponding to the external shape of the electrode assembly.

According to circumstances, the shape of the receiving unit shown in FIG. 4 may correspond to the external shape of the electrode assembly. In this case, no vacuum application process may be carried out.

As can be seen from FIGS. 2 to 6, is possible to manufacture the battery cell according to the present invention such that the battery cell has various capacities and sizes, to easily mount the battery cell even in a space, in which a conventional battery cell is difficult to be mounted, and to mount the battery cell while having a larger capacity in a limited spaced according to the internal structure of a device, thereby maximizing utilization of the internal space of the device.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured to have a deformable shape, whereby it is possible to easily secure a battery cell installation space in a device, to maximally utilize an internal space of the device, to mount a battery cell having a high capacity in the device, and to further miniaturize the device. In addition, it is possible to easily manufacture a desired battery cell due to structural characteristics of an electrode assembly and a battery case although the design of the battery cell is changed.

The invention claimed is:

1. A battery cell configured to have a structure in which an electrode assembly, comprising positive electrodes, negative electrodes, and separators disposed respectively between the positive electrodes and the negative electrodes, is mounted in a battery case, wherein
the electrode assembly comprises two or more electrodes or unit cells stacked in a height direction when viewed in a plan view,
the battery case is provided with a receiving unit, in which electrode assembly is mounted,
the electrode assembly is configured to have a quadrangular shape having side (a), side (b), side (c), and side (d) when viewed in a plan view, and inclined such that an interior angle between side (a) of each of the electrodes or the unit cells and side (b) adjacent to side (a) is less than 90 degrees, side (a) through side (d) define a plane in which side (a) and side (c) are parallel to each other, and each of the electrodes or unit cells has an electrode terminal located at side (a),
each electrode or unit cell having the same quadrangular shape,
the height direction is normal to said plane, and
the receiving unit of the battery case has an internal shape corresponding to a planar shape of the electrode assembly.

2. The battery cell according to claim 1, wherein each of the unit cells is a bi-cell in which electrode terminals located at opposite ends of a structure in which one or more positive electrodes and one or more negative electrodes are stacked in a state in which one or more separators are disposed respectively between the positive electrodes and the negative electrodes have the same polarity or a full cell in which the electrode terminals located at the opposite ends of the stacked structure have different polarities.

3. The battery cell according to claim 1, wherein the electrodes or the unit cells are stacked such that the electrode terminals are arranged together at upper sides or lower sides of the electrodes or the unit cells.

4. The battery cell according to claim 1, wherein the electrodes or the unit cells are stacked such that first electrode terminals are arranged at upper sides of the electrodes or the unit cells and second electrode terminals are arranged at lower sides of the electrodes or the unit cells opposite to the upper sides of the electrodes or the unit cells.

5. The battery cell according to claim 4, wherein the first electrode terminals are positive electrode terminals, and the second electrode terminals are negative electrode terminals.

6. The battery cell according to claim 1, wherein the interior angle between side (a) and side (b) is 20 to 89 degrees.

7. The battery cell according to claim 1, wherein side (b) and side (d) are parallel to each other.

8. The battery cell according to claim 1, wherein the electrodes or the unit cells each have a parallelogram shape or a diamond shape when viewed in a plan view.

9. The battery cell according to claim 1, wherein the battery case is made of a laminate sheet comprising a metal layer and a resin layer.

10. The battery cell according to claim 9, wherein the laminate sheet is an aluminum laminate sheet.

11. The battery cell according to claim 1, wherein the battery case has a thickness of 50 to 200 µm.

12. The battery cell according to claim 1, wherein the battery case is deformed so as to correspond to an external shape of the electrode assembly when vacuum is applied into the battery case.

13. The battery cell according to claim 12, wherein the receiving unit of the battery case has a rectangular parallelepiped shape before vacuum is applied into the battery case.

14. The battery cell according to claim 1, wherein the battery cell is a lithium ion battery cell or a lithium ion polymer battery cell.

15. A battery pack comprising two or more battery cells according to claim 1 as unit cells.

16. A device comprising a battery pack according to claim 15 as a power source.

17. The device according to claim 16, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

18. A device comprising a battery cell according to claim 1 as a power source.

19. The device according to claim 18, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

* * * * *